3,079,985
**PROCESS FOR PREPARING SOLUBLE, SPORICID-
ALLY ACTIVE SOLID POLYGLYOXALS**
Werner Richard Boehme, Somerville, and Edwin Thomas
Chinery, Middlesex, N.J., assignors to Ethicon, Inc., a
corporation of New Jersey
No Drawing. Filed Sept. 29, 1959, Ser. No. 843,055
6 Claims. (Cl. 159—48)

This invention relates to a novel, solid polyglyoxal product and to methods for its preparation.

Glyoxal, otherwise known as oxaldehyde of the empirical formula $C_2H_2O_2$, is commercially available in the form of an aqueous solution which is colorless. This solution, as well as the glycol addition compound of glyoxal, are both stable but the anhydrous monomeric compound polymerizes rapidly even at a low temperature. The commercially available solution is a 30% concentration (aqueous) containing approximately 7% to 18% ethylene glycol and lesser amounts of formaldehyde, glycollic acid and formic acid.

Although certain forms of solid polyglyoxal are known and methods for their preparation are described in the literature, none of the known methods lend themselves readily or economically to the preparation of a solid form from the commercial solution. Thus, prolonged vacuum evaporation of aqueous glyoxal solution requires close temperature control to avoid overdrying and results in the formation of insoluble polymers or polymers of lowered solubility. The effect of prolonged application of heat also causes some degradation and the loss of active glyoxal.

In the copending application of Pepper et al., filed September 29, 1959, Serial Number 843,297, now abandoned, which is a continuation-in-part of application Serial No. 692,581, filed October 28, 1957, now abandoned, both of which Serial No. 79,966, filed January 3, 1961, now U.S. Patent 3,016,328, is a continuation in part there are described various sporicidally active compositions comprising glyoxal, an alkali metal salt and 70% isopropanol. Although these compositions are extremely active against a variety of spores and thus lend themselves readily to use in cold sterilization techniques, the instability of glyoxal in liquid form, i.e., aqueous or hydroalcoholic solutions, presents commercial difficulties with respect to marketing of the above-mentioned sporicidal compositions. Thus, it becomes apparent that if a solid, stable form of glyoxal could be made cheaply from the commercial product, it would be possible to make the sporicidal composition available to the consumer in such a way that, by simple admixture of the dry glyoxal with isopropanol and an alkali metal salt, a sporicidally active composition could be made ready for use.

During the course of our investigations for the discovery of a method of transforming commercially available glyoxal into a solid, stable form, conversion by means of direct spray-drying was attempted without success. This is likely due to the fact that the ethylene glycol which is present in the commercial glyoxal interferes with the spray-drying process because of its hygroscopicity.

We have now discovered that commercially available glyoxal containing ethylene glycol as an impurity can be readily spray-dried into a desirable, stable, substantially dry form by conducting the spray-drying procedure in the presence of an alkali metal salt of a carbonate or bicarbonate such as for example, sodium carbonate, potassium carbonate, sodium bicarbonate or potassium bicarbonate. The inclusion of such alkali metal carbonates or bicarbonates in the spray-drying process permits the material to be spray-dried into a dry form which is very soluble in water and in 70% isopropanol. If desired, detergent additives may be incorporated into the feed materials to increase the solubility of the alkali metal salt in isopropanol and to increase the penetration and activity of the final sporicidal solution on surgical instruments such as forceps and scissors where the hinge surfaces are difficult to sterilize or where dry blood may be present. Examples of such additives are solid polyalkyleneglycols, i.e., polyethyleneglycol or polypropyleneglycol such as Carbowax 4000 which may be added in concentrations of 10% to 100% of the contained glyoxal, preferably from about 20% to about 50%.

The concentration of added alkali metal carbonate or bicarbonate may be from about 10% to about 100% of the weight of contained glyoxal, preferably from about 30% to about 50%. In conducting the spray-drying procedure, the employment of proper temperatures is critical. Temperatures of the inlet air of the spray-dryer may vary from 150° F. to 400° F., preferably 200° F. to 300° F., and of the outlet air from 100° F. to 280° F., preferably from 150° F. to 200° F.

As a specific example of the method which may be used for the preparation of the novel solid glyoxal of this invention, a solution of 150 parts by weight of sodium bicarbonate in 1000 parts by volume of commercial 30% glyoxal solution is spray-dried into a conical spray dryer at an inlet temperature of 300° F. and an outlet air temperature of 215° F. The resulting product is a light cream-colored powder containing 41.2% glyoxal. As another example, a solution of 150 parts of potassium bicarbonate in 1000 parts by volume of commercial 30% glyoxal solution is spray-dried at an inlet temperature of 200° F. and an outlet air temperature of 150° F. The product is a cream-colored powder containing 37.8% glyoxal.

In actual practice the solid, stable form of glyoxal of this invention is added, in a quantity of from about 1.0 to about 5, preferably from about 2.0 to about 3.0 parts by weight to 100 parts by volume of 70% isopropanol. The resulting composition is capable of killing anaerobic bacterial spores after a period of three hours in fluid thioglycollate medium, and aerobic bacterial spores, in a period of one to four hours, as shown by growth in eugon broth.

The final product obtained in accordance with the novel process of this invention is a glyoxal polymer containing, in physical admixture, a quantity of the particular alkali metal carbonate or bicarbonate employed during the spray-drying procedure together with free glycol, formic acid in the form of its salt, and 2,3-dihydroxydioxane. The product is white to cream in color, is in the form of amorphous hollow spheres and is freely soluble in water and hydroalcoholic solutions.

Although our novel process is particularly useful for the preparation of a solid, stable glyoxal polymer from commercially available glyoxal, that is to say, an aqueous glyoxal solution containing ethylene glycol as an impurity, it also lends itself to the preparation of substantially dry, solid glyoxal from substantially pure aqueous glyoxal solutions. For example, if one directly spray-dries a pure aqueous solution of glyoxal, the resulting product is a dense material which is very slowly soluble in water. However, if one adds to the spray-drying process a small quantity of an alkali metal carbonate or bicarbonate, as for example, from about 0.05% to about 1%, preferably from about 0.1% to about 0.5%, of potassium or sodium carbonate or bicarbonate, the resulting product is a fluffy powder which is readily soluble in water and hydroalcoholic solutions as opposed to the former which has a high density and is difficultly soluble in water. In this modification of our process, the limits of inlet air temperature and outlet air temperature may be the same as those employed for spray-drying of the commercial glyoxal as described above.

Table I below shows the sporicidal activities of solutions prepared from the product of the modified process of this invention and containing 2.5 grams of spray-dried powder in 100 ml. of 70% isopropanol. Test organisms=*Bacillus subtilis, Bacillus pumilus, Clostridium tetani* and *Clostridium sporogenes.*

*Table I*

| | Thioglycollate broth—Hours | | | | Eugon broth—Hours | | | |
|---|---|---|---|---|---|---|---|---|
| | 1 | 2 | 3 | 4 | 1 | 2 | 3 | 4 |
| Run #1* | + | + | − | − | + | + | + | − |
| Control** | + | + | − | − | + | + | + | − |
| Run #2* | + | + | − | − | + | − | − | − |
| Control** | + | + | − | − | + | − | − | − |

(+)=growth.
(−)=no growth.
(*)=spray-dried preparation.
(**)=3.3 ml. of 30% commercial liquid glyoxal solution and 0.5% sodium bicarbonate in 100 ml. of 70% isopropanol.

It is to be understood that spray-drying methods described herein are not intended to be limited to any particular mechanism, device or means of effecting drying through spray techniques. Any suitable means may be employed to accomplish the physical transition, including well-known, commercially available spray-drying devices, it being only important, insofar as this invention is concerned, to maintain the proper temperature conditions and to include in the spray mixture the additives necessary to effect the desired result.

What is claimed is:

1. The process of preparing a dry, solid glyoxal product which comprises the step of spray-drying an aqueous solution of glyoxal containing ethylene glycol at an inlet air temperature of from about 150° F. to about 400° F. and an outlet air temperature of at least 50° less than the inlet air temperature, an amount of from about 10% to about 100% of the contained glyoxal of an alkali metal salt being incorporated therein.

2. The process as set forth in claim 1 wherein the alkali metal salt is sodium bicarbonate.

3. The process as set forth in claim 1 wherein the alkali metal salt is potassium bicarbonate.

4. The process of preparing a dry, solid glyoxal product which comprises the step of spray-drying a pure aqueous glyoxal solution at an inlet air temperature of from about 150° F. to about 400° F. and an outlet air temperature of at least 50° less than the inlet air temperature from about 0.05% to about 1% of the contained glyoxal of an alkali metal salt being incorporated therein.

5. The process as set forth in claim 4 wherein the alkali metal salt is potassium bicarbonate.

6. The process as set forth in claim 4 wherein the alkali metal salt is sodium bicarbonate.

References Cited in the file of this patent

UNITED STATES PATENTS 2,018,797 Lewis ------------------ Oct. 29, 1935

FOREIGN PATENTS 653,588 Great Britain ----------- May 16, 1951

OTHER REFERENCES

Weissberger: Technique of Organic Chemistry, vol. III (1950), page 626.